Nov. 6, 1951  S. KHALIL  2,574,266
FLEXIBLE VALVE
Original Filed April 10, 1947  2 SHEETS—SHEET 1
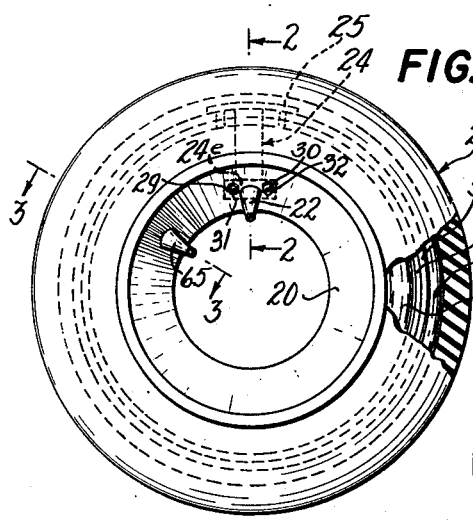
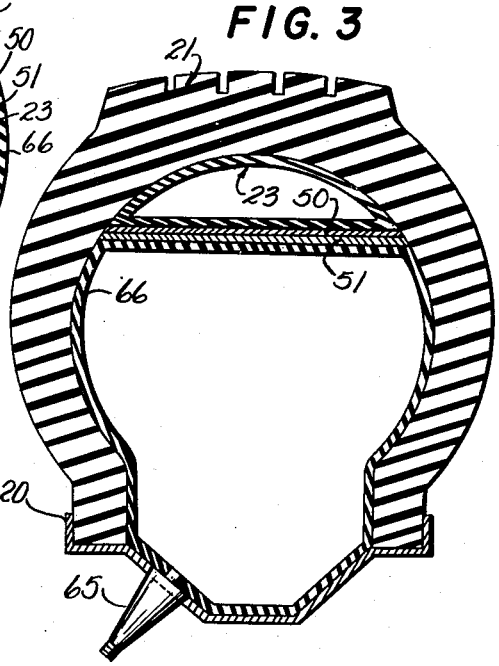
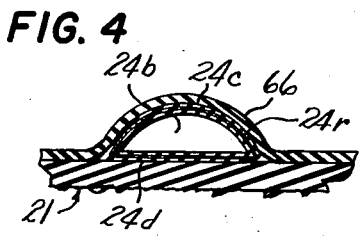
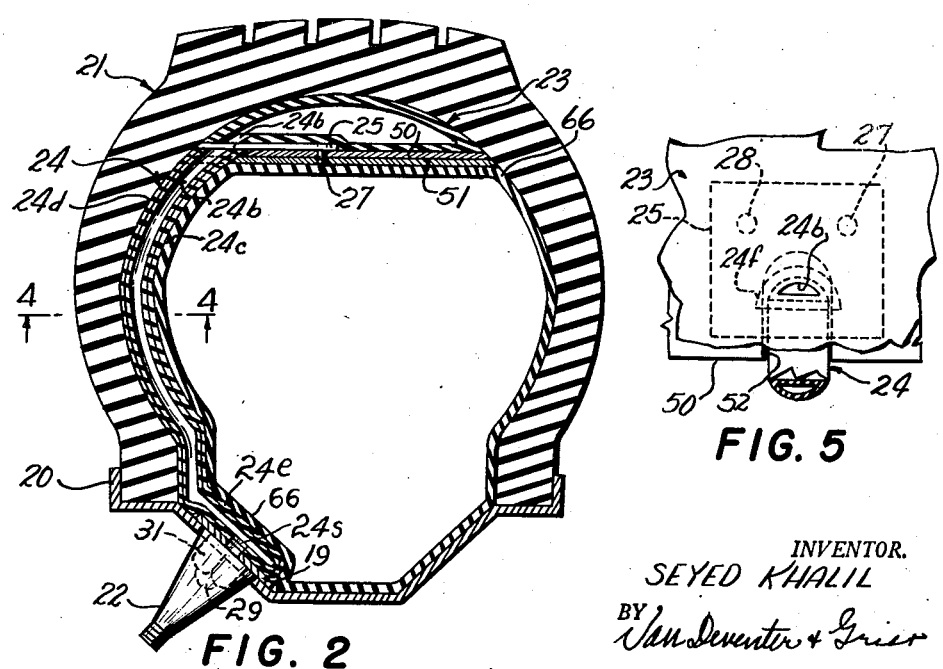
INVENTOR.
SEYED KHALIL
BY
Van Deventer & Grier
ATTORNEYS.

Nov. 6, 1951     S. KHALIL     2,574,266
FLEXIBLE VALVE

Original Filed April 10, 1947     2 SHEETS—SHEET 2

INVENTOR.
SEYED KHALIL
BY
Van Deventer & Grier
ATTORNEYS.

Patented Nov. 6, 1951

2,574,266

UNITED STATES PATENT OFFICE 2,574,266

FLEXIBLE VALVE

Seyed Khalil, New York, N. Y.

Original application April 10, 1947, Serial No. 740,530, now Patent No. 2,524,808, dated October 10, 1950. Divided and this application July 21, 1947, Serial No. 762,271

19 Claims. (Cl. 152—340)

This invention relates to Improvements in Flexible Valves, and is more particularly adapted to be used with the secondary tube of my own pneumatic tire for which an application, Ser. No. 740,530, filed April 10, 1947 has matured into Patent Number 2,524,808 on October 10, 1950.

In said pneumatic tire there are two tubes which are called in said application a primary and a secondary tube, respectively.

My new and improved flexible valve, being adapted to be secured in fluid-tight relation to said secondary tube, will be referred to as the secondary valve, and accordingly, the valve which is secured to the primary tube, will be referred to as the primary valve.

One object of this invention is to provide a primary valve and a secondary valve for said primary and secondary tubes, respectively, extending out through the rim. The inlet of one of said valves extends through the existing opening (which is generally used for the passage of a valve of the prior art) and provides an extra opening similar to said existing opening to accommodate the passage of the inlet of the other valve therethrough.

Another object of this invention is to provide a solid short valve for said primary tube and a long and flexible valve for said secondary tube so that said flexible valve, due to its length, passes from said secondary tube through the chamber occupied by the primary tube and thence to the rim; and due to its flexibility, sustains the flexure of the tire.

Still another object of this invention is to provide an individual valve for each tube so that a small amount of air may be admitted in the secondary tube after it has been mounted in the casing and before the shield is mounted in said casing.

Another object of this invention is to provide an individual valve for each tube so that a small amount of air may be admitted in the primary tube after it had been mounted in the casing and before the casing is mounted on the rim. This is similar to the prevailing practice in the mounting of a single tube in the casing and the mounting of the casing on the rim.

Still another object of this invention is to provide an individual valve for each tube so that the air pressure in each tube can be tested (by the standard gauges) to determine by a contrast between the normal air pressure, per square inch, and the lost air pressure (if and when there is a loss of air pressure) whether there is an air leakage in the tube. For instance, if the normal air pressure was twenty-four pounds in the primary tube and six pounds in the secondary tube, and if a test of primary tube shows no loss of air pressure while a test of secondary tube shows a loss of three pounds of air presure, it will be an indication that there is a leakage in said secondary tube as three pounds is equal to one-half of the normal air pressure of said secondary tube. Had a test been made of the combined air pressure in both tubes, the loss of three pounds of air pressure would not indicate any leakage as three pounds is ten percent (10%) of the total air pressure in both tubes.

Yet another object of this invention is to provide an individual valve for each tube so that either a given amount of air pressure be admitted in one of said tubes, or an unproportional amount of air pressure be admitted in both of said tubes.

Another object of this invention is to provide an individual valve for each tube so that each of said tubes may be partially inflated for testing by the prevailing process, such as for example submerging each tube in a tank of water to find out (by bubbling of the water) whether there is a leak in the tube.

A further object of this invention is to provide an individual valve for each tube so that the presence of the two valves on the outside of the rim conspicuously indicate that the tire is my invention which has two tubes, shield, etc. One of the advantages of this is to show by a bird's eye to a garage man, repair man, etc., what kind of tire it is and consequently how to handle it.

Still another object of this invention is to provide a plug adapted to close said extra opening (which is made for the passage of the second valve) in the rim whenever a single tube of the prior art is to be mounted in the casing instead of my primary and secondary tubes.

*Mechanism of my valves*

Now, the mechanism of my valves is to be described.

The primary tube is mounted immediately over the rim, while the secondary tube is mounted immediately beneath the inner surface of the tread of the casing. Said primary and secondary tubes are separated from each other by means of a shield, partition, or other suitable resistance, as clearly described both in said application and in this specification.

The position which is occupied by the primary tube in the interior of said casing is, in said application, called primary chamber, while the position occupied in said casing by the secondary tube is called secondary chamber.

From the preceding explanation, it can be seen that no special valve is needed for the primary tube. Consequently, I fasten, preferably vulcanized to the primary tube, a valve commonly used with a pneumatic tire, and I extend said valve to the outside of the rim through the same opening which is usually used for the passage of the valve of an ordinary single tube.

But a similar valve cannot be directly fastened to the secondary tube, because; first, the secondary tube requires a much longer valve than the primary tube does, as said valve has to pass from the secondary chamber (through a slot in the shield between the tubes) to the primary chamber and thence through the rim; and, secondly, since the depth of the casing, and particularly the depth of the primary chamber due to the flexure alternately changes, the part of the secondary valve which passes through the primary chamber, must comply to said flexure.

Consequently, I have invented, for my secondary tube, a novel valve which is called herein a flexible valve, and which will be presently described.

My flexible valve consists of two parts which are called herein an inlet part, and extension part, respectively. One end of said extension part is fastened (preferably vulcanized) to the secondary tube, while the other end thereof is fastened to the inner end of said inlet part.

The extension part passes through the casing while the inlet part projects through the rim. Accordingly, the length of said extension part is much longer than that of the inlet part.

The inlet part is similar in design and function to many a valve of the prior art which is used in a pneumatic tire. It extends from said rim through an opening which is provided for this purpose, and which is similar to the opening through which the valve of the primary tube passes out from the rim.

The extension part is made of a tubing which has both sufficient flexibility to comply with flexure of the casing and enough resistance against the required air pressure for the casing so as to resist the pressure which is exerted upon it from the primary tube. It is, preferably, made of a stiffer rubber with reinforcing means therein.

It is designed to lie in flat contact with the inner face of the casing, and to provide a smooth arcuate contact with the primary tube. It bears against the inner side of the casing and remains firmly in its position by means of two dowel pins which are carried by a reinforcing plate secured on the secondary tube, which engage corresponding dowel holes formed in the annular shield between the primary and secondary tubes, and by means of its two bolts which are extended through the rim and held there by two nuts.

Thus, in addition to the ordinary hole for the valve of the primary tube, three more holes are provided in the rim, one of which is for the passage of the secondary valve, as previously described, and the remaining two holes are for the passage of said two bolts.

These three additional holes can be made in the rim by a mechanic or worker in any garage with a simple drilling device.

It is believed that the distinctive appearance of tires made according to the invention will in time come to be recognized as a "Symbol of safety."

The drawings

In the accompanying drawings:

Fig. 1 is an elevation of the complete tire assembly on a rim and shows two valves which extend outside of the rim, so that both tubes may be inflated individually to the required pressures;

Fig. 2 is an enlarged section taken along the lines 2—2 of Fig. 1;

Fig. 3 is an enlarged sectional view taken along the line 3—3 of Fig. 1;

Fig. 4 is an enlarged fragmentary sectional view taken along the line 4—4 of Fig. 2;

Fig. 5 is an enlarged fragmentary view of a reinforcing member built into the secondary tube to span clearance slots formed in the shield elements;

Figure 6:
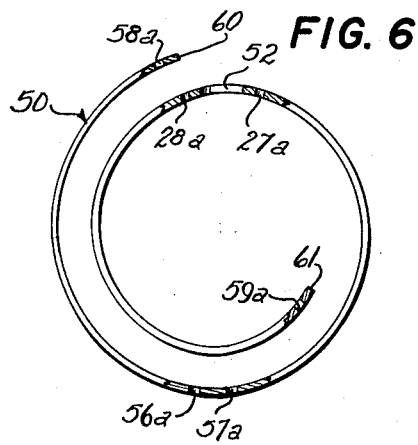
Fig. 6 represents one element of the shield.

Referring to the drawings, a rim 20 has a casing 21 mounted thereon and within the casing are my primary tube 66 and secondary tube 23 with my shielding means (to be presently described) therebetween.

Now, in order to supply air to the secondary tube 23 I have devised an improved valve having an extension part 24 having an air passage 24b therein. This extension has a flat face 24d which bears against the inner wall of the casing 21 and the opposite face of the extension, designated 24c, has a curved face which is spanned by a portion of the wall of the primary tube 66. The extension is secured to a reinforcing plate 25 which is vulcanized onto the secondary tube to reinforce its air opening and to bridge clearance notches formed in my shield, which is preferably between the primary tube and the secondary tube, which will be presently described. The extension is provided with a flap 24f to reinforce the joint between the plate 25 and the extension.

The extension 24 may be formed of a less flexible rubber or the like than is used in forming the primary and secondary tubes and also the extension 24 may have reinforcing means 24r embedded in the material to prevent it from collapsing and the passage 24b therein from closing, when the primary tube 66 is inflated. The extension 24, near its extremity, has imbedded therein a flat metallic plate 19 which supports the valve member 22, said valve member projected downwardly from the plate as viewed in Figure 12, and spaced apart from the valve member 22 on each side thereof are depanding bolts 29 and 30, which are engaged by nuts 31 and 32 as seen in Figure 1. When the rim 20 has three aligned holes formed therein, one to accommodate the valve member 22 and the other two to accommodate the bolts 29 and 30, the reinforcing plate 19 spans all three of the holes in the rim, and when the tire is being assembled, the extended portion 24e is positioned, as pointed out above, with the valve 22 extending through the central larger hole and the studs 29 and 30 extending through the smaller holes on either side of the larger hole. Then the nuts 31 and 32 are applied to hold the tube in place before the tire is inflated. After the tire is inflated, obviously the air tends to hold the extension in place but the bolts act at all time to prevent any relative movement between the rim and the extension portion.

Figure 7:
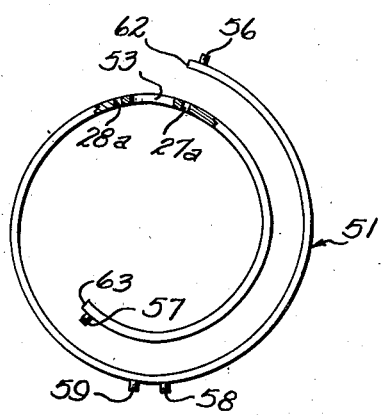
Fig. 7 represents another element of the shield.

My shield between the primary and secondary tube is comprised of a metallic member 50, shown in Figure 6, and a second member 51, which is shown in Figure 7.

Adjacent to the end 60 of the shielding member 50 is a hole 58a; about a third of the length of the member 50 away from the ends 60 are dowel holes 56a and 57a; and about two-thirds of the length of the member from the end 60 is a clearance slot 52 with dowel holes 27a and 28a on either side thereof, and adjacent to the end 61 is a dowel hole 59a.

Adjacent to the end 62 of the shielding member 51 is a dowel pin 56; about a third of the length of the member away from the end 62 are dowel pins 58 and 59; and about two-thirds of the length from the end 62 is a clearance slot 53 with dowel holes 28a and 27a on each side thereof, and adjacent to the end 63 is a dowel pin 57.

In assembling the members 50 and 51 into the casing, the member 50 is first spiraled so that it will enter the opening 21a in the casing. After it is inserted, it is allowed to expand and the member 51, spiraled, as shown in Figure 7, is inserted, and this is allowed to expand. The dowel 56 is inserted into the dowel hole 56a; then, the dowel pins 58 and 59 are inserted, respectively, in the dowel holes 58a and 59a near the abutting ends of the shield member 50, and then the dowel 57 is inserted into the dowel hole 57a. Since these members are springy, and since the points of engagement are approximately a hundred and twenty degrees apart, the assembling of these two elements is very easy and the clearance slot 53 is positioned to clear the valve member 24 by the engagement of the dowel holes 27a and 28a on either side of the clearance slot with the dowel pins 27 and 28 which extend inwardly through the shield member 25. Following this, the primary tube 66 is positioned in the casing and the whole array is then placed on the rim 20.

In placing the array on the rim, the valve head 22 is inserted in the center hole of the three holes formed in the rim and the threaded bolts 29 and 30 extend through the holes on each side of the center hole, and have securing nuts 31 and 32, respectively, applied thereto. Then, the valve 65 of the primary tube 66 is pulled into the fourth hole formed in the rim for that purpose. Air under pressure delivered through the valve 22 will inflate the secondary tube only, as diagrammatically shown in Figure 2, while air under pressure delivered through the valve 65 will inflate tube 66 only, as shown diagrammatically in Figure 3.

Figure 10:
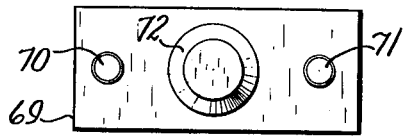
Fig. 10 is a side elevation of a closure member which may, in a special case, be used to close three of the four holes on the rim of Fig. 1.
Figures 11, 12:
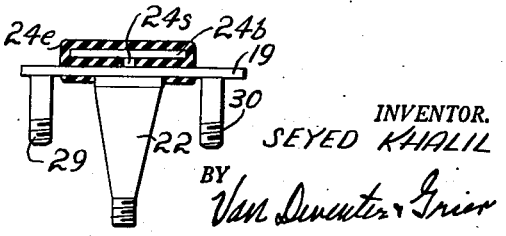
Fig. 11 is a plan view of the closure member shown in Fig. 10.
Figure 12 is an elevation partly in section taken at right angles to the plane of Figure 2 as indicated on Figure 1.

In instances where the rim is provided with three extra holes, such as are used with my new and improved tire, and it is desired to use a regular tire on said rim, the device illustrated in Figures 10 and 11 may be used to close these three holes.

Referring to Figures 10 and 11, a rectangular body 69 is provided with a beveled boss 72 which fits the center of the three holes in the rim, and spaced apart from this boss are threaded studs 70 and 71. These extend through the holes on each side of the center hole and the device may be secured in position on the rim by the nuts 31 and 32.

*Assembling the tire on the rim*

The assembling of my tire is done in the following order:

(a) Insert the secondary tube 23 in the casing 21.

(b) Partially inflate said secondary tube via the valve 22.

Figure 8:
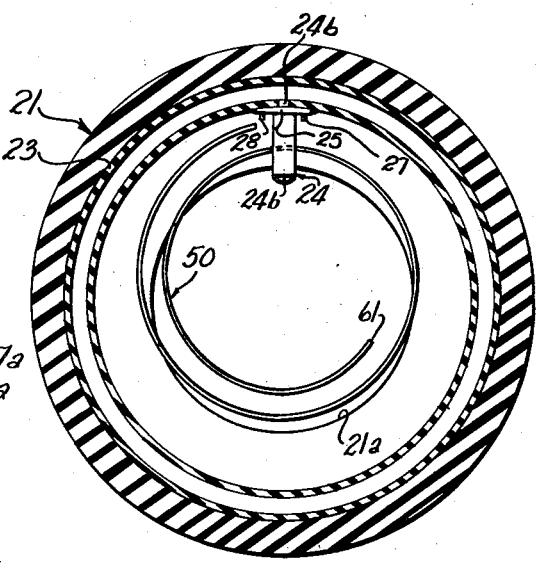
Fig. 8 shows the method of mounting the shield of Fig. 6 in a casing after the secondary tube had been mounted in said casing.

(c) Insert the shield 50 in said casing 21, as shown in Fig. 8. Notice in Fig. 8 the extension 24 extends through the slot 52 of the shield 50.

Figure 9:
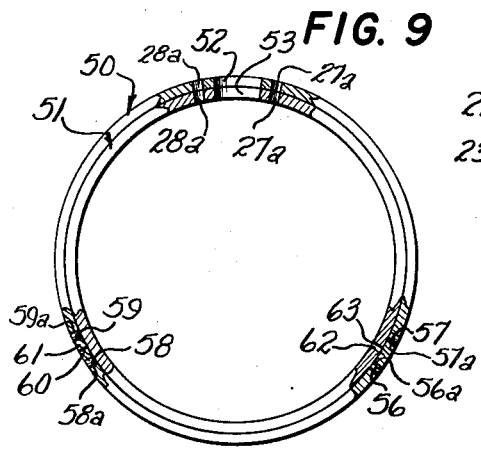
Fig. 9 shows diagrammatically the shield element of Figures 6 and 7 in interlocking relation, which is the relation they assume when assembled in the tire.

(d) Then, let said shield 50 unwind and take its normal outline; thereafter insert the shield 51, and see to it that the four pins 56, 57, 58 and 59 of the shield 51 enter the holes 56a, 57a, 58a and 59a, of the shield 50, as shown in Fig. 9, in which for clarity's sake the two shields are shown thicker than normal proportion.

(e) Be sure that the dowel pins 27 and 28 are entered in their respective holes 27a and 28a in the shield 50, 51, as shown in Figs. 1 and 2.

(f) Insert the primary tube 66 in the casing 21, taking care that the flat side 24d of the extension 24 contacts the inner wall of the casing 21 and consequently the curved side 24c of said extension faces the primary tube 66.

(g) Partially inflate primary tube 66 via its valve 65, making sure that said extension 24 is not twisted or displaced.

(h) Mount the array (casing 21, the tubes and the shields), on the rim 20 as in the usual manner. Pass the two valves through their respective holes in the rim. In doing so, care should be taken that the two bolts 29 and 30 extend through their respective holes in the rim. Then, screw the two nuts 31 and 32 onto the bolts 29 and 30, respectively, and finally, complete the inflating of both said tubes (the secondary via the valve 22, and the primary via the valve 65).

Although I have herein shown and described by way of example one embodiment of the invention, it is obvious that many changes may be made in the arrangements shown and described within the scope of the following claims.

This application is a continuation in part of application Serial No. 740,530, filed on April 10, 1947, which has matured into Patent Number 2,524,808, on October 10, 1950 entitled "Improvements in Pneumatic Tires."

What is claimed is:

1. In a tire, a casing, a pair of pneumatic tubes in said casing, annular shielding means disposed between said tubes and extending laterally across the interior of said casing from wall to wall and dividing the interior of said casing into isolated chambers, a notch formed in one edge of said shielding means to provide a clearance passage therethrough, an elongated flexible conduit extending to the outer of said tubes and adapted to extend radially along the inner wall of said casing via said passage, and a valve carried in the end of said conduit.

2. In a tire, a casing, a tube within said casing adjacent to the tread thereof, a ring-like shield within said casing and forming therewith an isolated chamber for said tube, the periphery of said shield being equidistant from the central axis of said casing, a clearance passage formed in said shield, an elongated flexible conduit secured to said tube and extending via said passage and along the inner surface of said casing to a position where a valve carried in the end thereof may extend through the rim upon which said tire is to be mounted, and a second tube within said casing and having its outer periphery bounded by said shield, the side well of said second tube when inflated being adapted to span and partially embrace said flexible conduit where it lies in contact with the inner wall of said casing.

3. The invention according to claim 2, in which said first mentioned tube has secured thereto a reinforcing plate adapted to overlie said clearance passage when said tube, said shield and said valve are assembled within said casing.

4. The invention according to claim 2 in which said ring-like shield to facilitate the mounting of the same in said casing is comprised of at least two flexible metallic strips having clearance notches formed therein and adapted to be interlocked with said notches in alignment to form said clearance passage via which said flexible conduit passes, the abutting ends of one of said strips being circumferentially spaced with respect to the abutting ends of the other.

5. In a tire, a casing, a tube within said casing, a ring-like shield in said casing comprised of a pair of interlocking springy metallic strips having aligned notches therein to form a passage, the abutting ends of one of said strips being circumferentially spaced with respect to the abutting ends of the other, a reinforcing plate secured to said tube, an elongated flexible conduit extending from said reinforcing plate via said passage with said reinforcing plate overlying said passage and extending to a position outside of said casing where a valve carried by its inlet end may pass through a rim upon which said tire is to be mounted, and a second tube within said casing bounded on its outer periphery by said ring-like shield and bounded on its inner periphery by said rim.

6. In a pneumatic tire, a casing having a plurality of tubes therein with partition means therebetween, said partition means isolating said tube from contact with each other, notch means extending into said partition means from one edge thereof and forming a clearance passage, an elongated flexible conduit connected to one of said tubes and extending through said clearance passage, and a valve carried in the outer end of said conduit.

7. In a pneumatic tire, a casing having a pair of tubes therein with isolating means therebetween, said isolating means being comprised in part of an annular shield made of two interlocked metallic strips having a clearance passage formed therein from one edge thereof by notches in each which notches are aligned by the interlocking of said strips as they are assembled into said casing, and formed in part by a reinforcing plate secured to the outer of said tubes, and an elongated flexible conduit passing through both said rectangular shield means and said clearance passage.

8. In a tire, a casing adapted to be mounted on a rim, a tube within said casing, a ring-like shield within said casing bounding said tube and having its periphery parallel to and concentric with the axis of said casing, an elongated flexible conduit extending from said tube via a clearance passage formed in said shield to an opening formed in said rim, a valve carried in the end of said conduit, and a second tube within said casing and having its outer periphery also bounded by said shield, said second tube having a valve extending through a second opening formed in said rim, said tubes being adapted to be individually inflated via their respective valves.

9. The invention according to claim 7 in which dowell means is provided for maintaining said reinforcing plate and the clearance passage in said annular shield in registration.

10. A pneumatic tube having an elongated flexible conduit extending therefrom and comprised of an inlet part and an extension part, said inlet part carrying a valve per se and said extension part being of a D-shaped cross-section so that the flat portion thereof is adapted to contact the inner wall of a casing in which said tube is to be mounted, and adapted to be immobilized by the inflation of a second tube in contact therewith in said casing.

11. The invention according to claim 10 in which said extension part of said conduit is comprised of rubber-like material of a different consistency from that of said tube.

12. In a pneumatic tube, an elongated conduit including an extension part of substantially D-shaped cross-section and adapted to lie with its flat face in contact with the inner wall of a casing, said elongated conduit including an inlet part which extends into a substantially rectangular terminal and a valve per se extending laterally from said terminal and having its interior in communication with the interior of said inlet part, and orienting means on said terminal to engage a rim upon which a casing carrying said tube is mounted.

13. A pneumatic tube according to claim 12 in which said terminal has, in addition to the valve per se extending laterally therefrom, a pair of threaded studs adapted to extend through spaced holes in a rim upon which a tire containing said tube is to be mounted, said studs being adapted to be engaged by nuts for retaining said terminal and the valve carried thereby in a fixed position in said tire.

14. In a pneumatic tire, an elongated air conduit including an extension part substantially D-shaped and adapted to have its flat surface to lie in contact with the inner wall of a casing in which said tube is positioned, said extension part including reinforcing means.

15. In a tire, a casing adapted to be carried on a rim, said rim having two valve holes formed therein and spaced apart from each other, said rim also having two bolt holes adjacent to and spaced on each side of one of said valve holes, said bolt holes forming locating holes, a tube within said casing, a ring-like shield within said casing bounding said tube and having an elongated flexible conduit extending therefrom via a clearance passage formed in said shield, said conduit having an inlet part from which a valve per se extends laterally and having a pair of bolts spaced on each side of said valve per se equal to the spacing of said bolt holes with respect to the valve hole to which they are adjacent parallel to and spaced apart from said valve, said bolts being adapted to extend through said bolt holes in said rim and said valve being adapted to extend through the valve hole adjacent thereto, and a second tube in said casing having a valve adapted to extend through the other valve hole formed in said rim.

16. In a tire, a casing, a plurality of air compartments with metallic isolating means therebetween, each of said metallic isolating means being annular in form and extending from wall to wall across said casing, and individual valves for supplying air thereto.

17. In a tire, a casing, a secondary tube having an air inlet hole, a valve adapted to project from a rim upon which said casing is to be mounted, an air conduit extension having substantially D-shaped cross-section, one end being secured to said inlet hole and having the other end secured to said valve, and reinforcing means embodied in said conduit for imparting rigidity thereto thereby enabling it to resist both external and internal air pressure, yet allowing it to yield to the flexure of said casing.

18. A rim having a pair of valve holes formed therein in spaced relation, bolt holes positioned on each side of one of said valve holes, a plate carrying a central boss fitting said last mentioned hole, studs on said plate spaced apart from said boss fitting said holes, thereby closing both said valve hole and said bolt holes when it is desired to use said rim with an ordinary casing and tube.

19. In a tire, a casing having a tread, a removable partition therein annular in form with a periphery parallel to and concentric with the axis of said casing, said partition dividing said casing into two isolated chambers, the outer chamber adjacent to said tread being substantially smaller than the other chamber, and valve means including a stem extending from said first-named chamber via said partition and through said other chamber.

SEYED KHALIL.

REFERENCES CITED

The following references are of record in the file of this patent:

UNITED STATES PATENTS

| Number | Name | Date |
| --- | --- | --- |
| 997,443 | Dunn | July 11, 1911 |
| 1,215,717 | Ruthven | Feb. 13, 1917 |
| 2,203,564 | Farnsworth | June 4, 1940 |
| 2,224,066 | Shore | Dec. 3, 1940 |
| 2,525,752 | Khalil | Oct. 10, 1950 |
| 2,524,808 | Khalil | Oct. 10, 1950 |

FOREIGN PATENTS

| Number | Country | Date |
| --- | --- | --- |
| 322,454 | France | 1902 |
| 639,721 | France | 1928 |
| 118,297 | Australia | 1944 |